(12) United States Patent
Stammberger et al.

(10) Patent No.: US 10,105,895 B2
(45) Date of Patent: Oct. 23, 2018

(54) APPARATUS FOR ADDITIVELY MANUFACTURING OF THREE-DIMENSIONAL OBJECTS

(71) Applicant: CL SCHUTZRECHTSVERWALTUNGS GMBH, Lichtenfels (DE)

(72) Inventors: Jens Stammberger, Rödental (DE); Fabian Zeulner, Lichtenfels (DE); Frank Schödel, Kronach (DE); Alexander Hofmann, Weismain (DE)

(73) Assignee: CL SCHUTZRECHTSVERWALTUNGS GMBH, Lichtenfels (DE)

(*) Notice: Subject to any disclaimer, the term of this patent is extended or adjusted under 35 U.S.C. 154(b) by 0 days.

(21) Appl. No.: 15/809,870

(22) Filed: Nov. 10, 2017

(65) Prior Publication Data
US 2018/0133962 A1 May 17, 2018

(30) Foreign Application Priority Data

Nov. 11, 2016 (DE) .................... 10 2016 121 648

(51) Int. Cl.
| | | |
|---|---|---|
| *B29C 64/255* | (2017.01) | |
| *B29C 64/153* | (2017.01) | |
| *B29C 64/321* | (2017.01) | |
| *B33Y 30/00* | (2015.01) | |
| *B33Y 50/02* | (2015.01) | |
| *B22F 3/105* | (2006.01) | |
| *B29C 64/393* | (2017.01) | |

(52) U.S. Cl.
CPC .......... *B29C 64/255* (2017.08); *B29C 64/153* (2017.08); *B29C 64/321* (2017.08); *B33Y 30/00* (2014.12); *B22F 2003/1056* (2013.01); *B29C 64/393* (2017.08); *B33Y 50/02* (2014.12)

(58) Field of Classification Search
CPC ... B29C 64/255; B29C 64/321; B29C 64/153; B29C 64/393; B29C 64/227; B29C 64/236
See application file for complete search history.

(56) References Cited

U.S. PATENT DOCUMENTS 6,554,600 B1    4/2003  Hofmann et al.
2016/0159008 A1 6/2016  Din et al.

FOREIGN PATENT DOCUMENTS

DE  102009029765 A1  12/2010
EP      1704989 A2    9/2006
EP      2193863 A1    6/2010

*Primary Examiner* — Edmund H Lee
*Assistant Examiner* — Jamel M Nelson
(74) *Attorney, Agent, or Firm* — Troutman Sanders, LLP (57) ABSTRACT

An apparatus (1) for additive manufacturing of three-dimensional objects (2) by successive, selective layer-by-layer exposure and thus solidification of construction material layers of a construction material (3) that can be solidified by an energy beam (5) generated by an energy beam generation device (4).

10 Claims, 4 Drawing Sheets

APPARATUS FOR ADDITIVELY MANUFACTURING OF THREE-DIMENSIONAL OBJECTS

CROSS-REFERENCE TO RELATED APPLICATIONS

This application claims priority to German Patent Application serial no. 10 2016 121 648.8 filed Nov. 11, 2016, the contents of which is incorporated herein by reference in its entirety as if set forth verbatim.

The invention relates to an apparatus for additive manufacturing of three-dimensional objects by successive, selective layer-by-layer exposure and thus solidification of construction material layers of a construction material that can be solidified by an energy beam generated by an energy beam generation device, comprising the further features of the preamble of claim 1.

Respective apparatuses for additive manufacturing of three-dimensional objects are per se known. Typical embodiments of respective apparatuses are apparatuses for performing selective laser sintering methods or selective laser melting methods.

Known apparatuses for additive manufacturing of three-dimensional objects comprise a frame construction with at least one receiving section for receiving a powder module comprising a powder reception room, i.e., for example, a construction module in which the actual additive manufacturing of three-dimensional objects is carried out. Respective powder modules comprise a carrying element that is height-adjustably supported, limiting the powder reception room at the bottom. Further, respective apparatuses comprise an adjustment device, which is provided for height-adjusting the carrying element of a powder module moved into the receiving section. The adjustment device comprises at least one height-adjustable adjustment element assembly, which is provided in an operating position for height-adjusting the carrying element of the powder module.

In connection with the realization of movements of the powder module received in a respective receiving device between a non-operating position, in which the powder module is arranged at a certain distance to a wall of the or a frame construction of the apparatus, limiting a process chamber of the apparatus, or the carrying element of the powder module (that is moved into an upper position) cannot be arranged or is not arranged in a construction field plane of the apparatus, in which the selective exposure or solidification of respective construction material layers is carried out, and an operating position, in which the powder module cannot be arranged or is not arranged at a certain distance to the wall of the or a frame construction of the apparatus, limiting a process chamber of the apparatus, or the carrying element of the powder module (that is moved into an upper position) can be arranged or is arranged in a construction field plane, there is a need for a functionally highly integrated, nevertheless compactly designed lifting device.

The invention is based on the object of providing an apparatus with a functionally highly integrated, nevertheless compactly designed lifting device, which is provided for realizing movements of the powder module that is received in a respective receiving device between a respective non-operating position and a respective operating position.

The object is solved by an apparatus according to claim 1. The dependent claims relate to possible embodiments of the apparatus.

The apparatus described herein ("apparatus") is provided for additive manufacturing of three-dimensional objects, i.e., for example, technical components or technical component groups, by successive, selective layer-by-layer exposure and thus solidification of construction material layers of a construction material that can be solidified by means of an energy beam, i.e. especially a laser beam. The construction material can especially be a particulate or powdered metal material, plastic material, and/or ceramic material. The selective solidification of respective construction material layers to be selectively solidified is carried out based on object-related construction data. Respective construction data describe the geometric structural design of the respective object to be additively manufactured and can for example include "sliced" CAD data of a respective object to be additively manufactured. The apparatus can be formed as an SLM apparatus, i.e. as an apparatus for performing selective laser melting methods (SLM methods), or as an SLS apparatus, i.e. as an apparatus for performing selective laser sintering methods (SLS methods).

The apparatus comprises a frame construction with at least one, e.g. shaft-like, receiving section for receiving a powder module. A respective powder module comprises a powder reception room. A powder module can, for example, be a construction module, in the powder reception room (construction room) thereof the actual additive manufacturing of three-dimensional objects is carried out, a metering module, which is provided for metering construction material from the powder reception room that can be applied in a construction plane in construction material layers to be selectively exposed or solidified by means of a coating device of the apparatus, or an overflow module, which is provided for receiving non-solidified construction material in the powder reception room. Respective powder modules comprise an, e.g. plate-like or plate-shaped, carrying element that is height-adjustably supported, limiting the powder reception room at the bottom. The carrying element is height-adjustably supported relative to the walls of the powder module limiting the powder reception room such that the powder reception room can be changed by movements of the carrying element relative to the walls limiting the powder reception room.

As described in more detail below, a powder module arranged in the receiving section is movably supported between a non-operating position, in which the powder module is arranged at a certain distance to a wall of the frame construction of the apparatus, limiting a process chamber of the apparatus, or the carrying element of the powder module (that is moved into an upper position) cannot be arranged or is not arranged in a construction field plane of the apparatus, in which the selective exposure or solidification of respective construction material layers is carried out, and an operating position, in which the powder module cannot be arranged or is not arranged at a certain distance to the wall of the or a frame construction of the apparatus, limiting a process chamber of the apparatus, or the carrying element of the powder module (that is moved into an upper position) can be arranged or is arranged in a construction field plane. As it follows from below, the operating position of the powder module typically corresponds to an upper position of the powder module, and the non-operating position of the powder module typically corresponds to a lower position of the powder module.

The apparatus further comprises an adjustment device which is provided for height-adjusting the carrying element of a powder module moved into the receiving section. The adjustment device comprises an, e.g. (electric) motor, adjustment drive and an adjustment element assembly, the components thereof are discussed in more detail below.

A first component of the adjustment element assembly is an adjustment element that can be height-adjusted via the adjustment drive, which is provided in an operating position for height-adjusting the carrying element of the powder module. The adjustment element can be an (elongated) adjustment spindle that can be driven to a respective height adjustment via the adjustment drive. The operating position of the adjustment element is defined in that the adjustment element directly abuts against the carrying element or there is only a small distance, i.e. typically a distance of a few millimeters, especially less than 5 mm, between the adjustment element and the carrying element. Accordingly, a non-operating position of the adjustment element is defined in that the adjustment element does not directly abut against the carrying element or there is a larger distance, i.e. typically a distance of several millimeters, especially more than 5 mm, between the adjustment element and the carrying element. As it follows from below, the operating position of the adjustment element typically corresponds to an upper position of the adjustment element, and the non-operating position of the adjustment element typically corresponds to a lower position of the adjustment element.

Another component of the adjustment element assembly is an, e.g. plate-like or plate-shaped, adjustment element table arranged or formed in the section of the free end of the adjustment element facing a carrying element of a module. The adjustment element table can enable a planar abutment on the carrying element in the operating position of the adjustment element. If the adjustment element is an adjustment spindle, the adjustment element table is an adjustment spindle table.

Another component of the adjustment element assembly can be an, e.g. plate-like or plate-shaped, carrier. The carrier is provided with an opening, e.g. in the form of a bore, possibly a threaded hole, that can be penetrated or is penetrated with the adjustment element. The adjustment element can thus be height-adjusted relative to the (unmoved) carrier. Conversely, height adjustments of the carrier cause height adjustments of the adjustment element.

The apparatus further comprises a lifting device comprising at least one lifting assembly. A respective lifting assembly comprises two lifting elements. A first lifting element is provided for generating a first partial lifting moving the powder module from the non-operating position (of the powder module) into the operating position (of the powder module), and vice versa. For this purpose, the first lifting element can typically be coupled or is typically coupled with the powder module. A second lifting element is provided for generating a second partial lifting moving the adjustment element assembly from the non-operating position (of the adjustment element assembly or the adjustment element) into the operating position (of the adjustment element assembly or the adjustment element). For this purpose, the second lifting element can typically be coupled or is typically coupled with the adjustment element assembly. Both partial liftings can add up to an overall lifting that can be realized with the lifting device or a respective lifting assembly.

The first lifting element of a lifting assembly is coupled for movement via a power transmission element, e.g. in the form of a chain, a belt or the like, with the second lifting element of the lifting assembly, such that the first partial lifting that can be generated or is generated via the first lifting element and the second partial lifting that can be generated or is generated via the second lifting element are carried out synchronously, or the generation of the first partial lifting that can be generated or is generated via the first lifting element and the generation of the second partial lifting that can be generated or is generated via the second lifting element are carried out synchronously. The synchronous carrying out of the first and the second partial lifting results in a combined movement of the powder module and the adjustment element assembly; consequently, movements of the powder module in the operating position thereof and movements of the adjustment element assembly in the operating position thereof are carried out combinedly. Movements of the powder module in the operating position thereof (especially starting at the non-operating position thereof) and movements of the adjustment element assembly in the operation position thereof (especially starting at the non-operating position thereof), and vice versa, are thus carried out in a coupled manner. The combination or coupling of the movements of the powder module and the adjustment element assembly makes it possible to keep the design of the respective lifting device extremely compact.

The lifting device or the at least one lifting assembly associated with it is thus provided for generating synchronous or combined lifting movements of a powder module and the adjustment element assembly or the adjustment element of the adjustment element assembly. The apparatus thus comprises a functionally highly integrated, nevertheless compactly designed lifting device.

Apart from that, the apparatus comprises the functional components typically required for performing additive construction processes, i.e. especially an energy beam or laser beam generation device, which is provided for generating an energy or laser beam for successive, selective layer-by-layer solidification of respective construction material layers, and a coating device, which is provided for forming construction material layers in a construction plane of the apparatus to be selectively solidified. Additive construction processes performed by means of the apparatus are carried out in a typically inertable or inerted process chamber associated with the apparatus. The process chamber can form part of the frame construction of the apparatus.

The first partial lifting that can be generated or is generated via the first lifting element is typically smaller than the second partial lifting that can be generated or is generated via the second lifting element. This is due to the fact that the second lifting element typically completes both the movements or lifting movements of the adjustment element assembly from the non-operating position thereof into the operating position thereof and the movements or lifting movements of the powder module from the non-operating position thereof into the operating position thereof, whereas the first lifting element completes only the movements or lifting movements of the powder module from the non-operating position into the operating position thereof. The first partial lifting that can be generated via the first lifting element can e.g. be in a range between 40 and 60 mm, the second partial lifting that can be generated via the second lifting element can e.g. be in a range between 60 and 90 mm.

The first lifting element can be movably supported between two end positions, wherein a first end position of the first lifting element is assigned to the operating position of the powder module, and a second end position of the first lifting element is assigned to the non-operating position of the powder module. As it follows from below, the respective end positions of the first lifting element can especially be rotational positions of the first lifting element. Assigning respective end positions of the first lifting element to the operating or non-operating position of the powder module is understood to mean that the powder module is moved into its operating position when the first lifting element is moved into the first end position, and the powder module is moved into its non-operating position when the first lifting element is moved into the second end position.

Analogously, the second lifting element can be movably supported between two end positions, wherein a first end position of the second lifting element is assigned to the operating position of the adjustment element assembly and a second end position of the second lifting element is assigned to the non-operating position of the adjustment element assembly. As it follows from below, the respective end positions of the second lifting element can especially be rotational positions of the second lifting element. Assigning respective end positions of the second lifting element to the operating or non-operating position of the adjustment element assembly is understood to mean that the adjustment element assembly is moved into its operating position when the second lifting element is moved into the first end position, and the adjustment element assembly is moved into its non-operating position when the second lifting element is moved into the second end position.

The first lifting element can be formed as or comprises a control element that is especially disk-like or disk-shaped, i.e. formed as a cam disk, rotatably supported centrically or eccentrically around a rotational axis, having a control surface defining an, especially curve-like or curve-shaped, trajectory of a certain length, e.g. in the form of a recess or groove in the first lifting element. The end positions of the first lifting element can be defined by the respective ends of the trajectory. However, it is also conceivable to define the end positions of the first lifting element by a piston end position of a drive or lifting piston of a lifting drive device or by stop elements defining end positions. The outer circumference of the first lifting element can be formed with power transmission elements, e.g. in the form of teeth, which enable a power transmission, i.e. especially a torque transmission, from the power transmission element to the first lifting element.

Analogously, the second lifting element can be formed as or comprises a control element that is especially disk-like or disk-shaped, i.e. formed as a cam disk, rotatably supported centrically or eccentrically around a rotational axis, having a control surface defining an, especially curve-like or curve-shaped, trajectory of a certain length, e.g. in the form of a recess or groove in the second lifting element. The end positions of the second lifting element can be defined by the respective ends of the trajectory. However, it is also conceivable to define the end positions of the second lifting element by a piston end position of a drive or a lifting piston of a lifting drive device or by stop elements defining end positions. The outer circumference of the second lifting element can be formed with power transmission elements, e.g. in the form of teeth, which enable a power transmission, i.e. especially a torque transmission, from the power transmission element to the second lifting element.

As mentioned, the first partial lifting that can be generated or is generated via the first lifting element is typically smaller than the second partial lifting that can be generated or is generated via the second lifting element. This is reflected in the length of the trajectories of the control surfaces of the respective control elements; the length of the trajectory of the control surface of the control element of the first lifting element is therefore typically smaller than the length of the trajectory of the control surface of the control element of the second lifting element.

The control element of the first lifting element can be coupled or is coupled, especially detachably (in a damage-free and non-destructive manner), with the powder module via an adjustment element movably supported along the control surface or in the control surface (when the control surface is designed as a recess or groove in the first lifting element). The adjustment element of the first lifting element can at least comprise a first coupling element for coupling the adjustment element with the control surface and at least one second coupling element for coupling the adjustment element with the powder module. The first coupling element can, for example, be an engagement element for engaging into a control surface formed as a recess or groove extending in a curve-like manner. The second coupling element can, for example, be an engagement element for engaging into a recess formed on the powder module. Respective engagement elements can be formed as or comprise sliding elements or rolling elements.

Analogously, the control element of the second lifting element can be coupled or is coupled, especially detachably (in a damage-free and non-destructive manner), with the adjustment element assembly, i.e. especially a carrier forming a component of the adjustment element assembly, via an adjustment element movably supported along the control surface or in the control surface (when the control surface is designed as recess or groove in the second lifting element). The adjustment element of the second lifting element can at least comprise a first coupling element for coupling the adjustment element with the control surface and at least one more coupling element for coupling the adjustment element with the adjustment element assembly. The first coupling element can especially be an engagement element for engaging into a control surface formed as a recess or groove extending in a curve-like manner. The second coupling element can especially be a support element for supporting a component of the adjustment element assembly, especially the carrier, or an engagement element for engaging into a recess formed on the adjustment element assembly, especially on a respective carrier. Respective engagement elements can be formed as or comprise sliding elements or rolling elements.

For generating a lifting power realizing the respective partial liftings, the apparatus can comprise one lifting drive device assigned to the at least one lifting assembly. The lifting drive device, especially formed acting pneumatically or hydraulically, is provided for generating a lifting power realizing the respective partial liftings, wherein a lifting drive element associated with the lifting drive device is coupled with the power transmission element of the lifting assembly. Consequently, the power transmission can be carried out between the lifting drive device and the lifting device directly via the power transmission means coupling the respective lifting elements of a lifting assembly.

In terms of the loads to be moved by means of the lifting device, it can be purposeful for the lifting device to comprise several lifting assemblies. The lifting assemblies forming the lifting device can be arranged in pairs. For example, a first pair of lifting assemblies arranged laterally adjacent and consequently next to each other can be arranged or formed on a first frame construction element, possibly a first wall of the frame construction of the apparatus, laterally limiting the receiving device, and a second pair of lifting assemblies arranged laterally adjacent and consequently next to each other can be arranged or formed on a second frame construction element, possibly a second wall of the frame construction of the apparatus, laterally limiting the receiving device. The first frame construction element laterally limiting the receiving device is arranged opposite the second frame construction element laterally limiting the receiving device, such that the pairs of lifting assemblies arranged laterally adjacent are arranged opposite each other.

In order to keep the number of components of the lifting device as low as possible and the design of the lifting device as compact as possible, to the first pair of lifting assemblies arranged laterally adjacent a first common lifting drive device can be assigned. The lifting drive element associated with the lifting drive device is coupled with both the power transmission element of the first lifting assembly and the power transmission element of the second lifting assembly of the first pair. Analogously, to the second pair of lifting assemblies arranged laterally adjacent a second common lifting drive device can be assigned. The lifting drive element associated with the lifting drive device is coupled with both the power transmission element of the first lifting assembly and the power transmission element of the second lifting assembly of the second pair.

In order to ensure synchronous movement in case of a respective arrangement of lifting assemblies in pairs and opposite to each other, opposing second lifting elements of the first and second pairs of lifting assemblies arranged laterally adjacent can be coupled for movement via a bar-like or bar-shaped coupling element connecting these, e.g. in the form of a power transmission bar.

Figure 1:
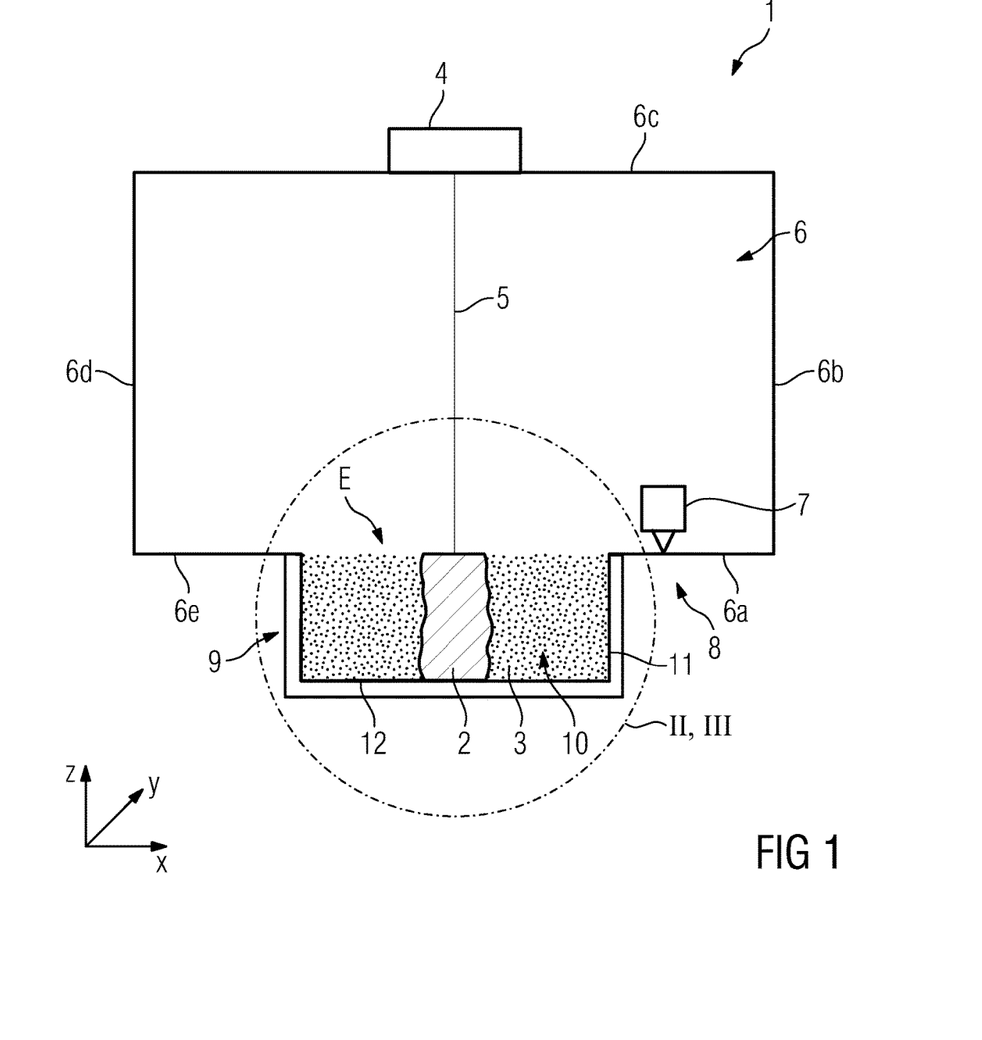
FIG. 1 shows a schematic diagram of an apparatus according to an exemplary embodiment.

The invention is explained in more detail by means of exemplary embodiments in the figures of the drawings. In which:

FIG. 1 shows a schematic diagram of an apparatus 1 according to an exemplary embodiment. In FIG. 1, only that detail of the apparatus 1 can be seen that is relevant for the discussion of the principle described in the following.

The apparatus 1 is provided for additive manufacturing of three-dimensional objects 2, i.e. especially technical components or technical component groups, by successive, selective layer-by-layer exposure and thus solidification of construction material layers of a construction material 3, i.e., for example, a metal powder, which can be solidified by means of a laser beam 5 generated by a laser beam generation device 4. The exposure and thus the selective solidification of respective construction material layers to be solidified are carried out based on object-related construction data. Respective construction data describe the geometric or geometric structural design of the respective object 2 to be additively manufactured. Respective construction data can, for example, include "sliced" CAD data of the object 2 to be manufactured.

The apparatus 1 comprises an inertable process chamber 6. The process chamber 6 is defined by wall elements 6a-6e. In the process chamber 6 at least one part of the functional components required for performing additive construction processes, i.e. especially a coating device 7 movably supported in a horizontal direction, which is provided for forming construction material layers in a construction plane, to be solidified, can be arranged or formed. The process chamber 6 can form part of a frame construction 8 of the apparatus 1.

Figure 2:
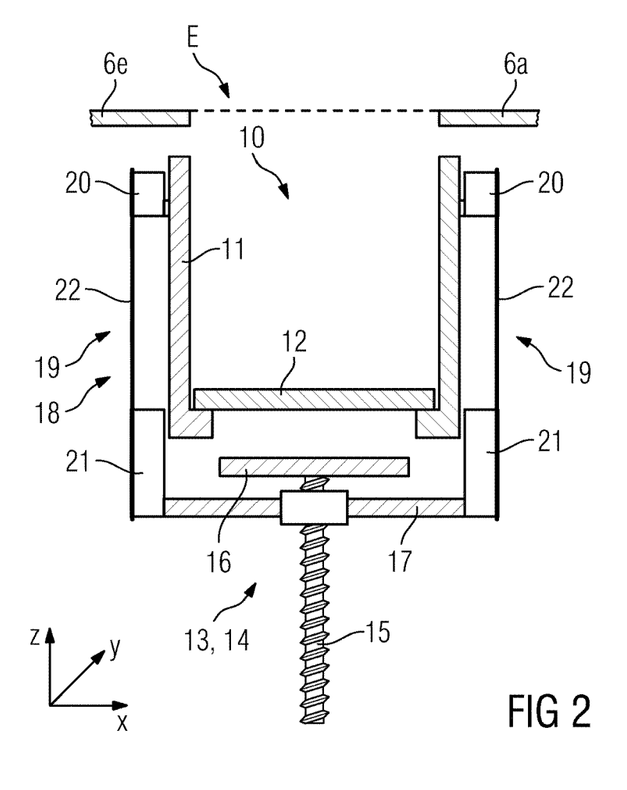
FIGS. 2, 3 each show an enlarged illustration of the individual unit II, III shown in FIG. 1.
Figure 3:
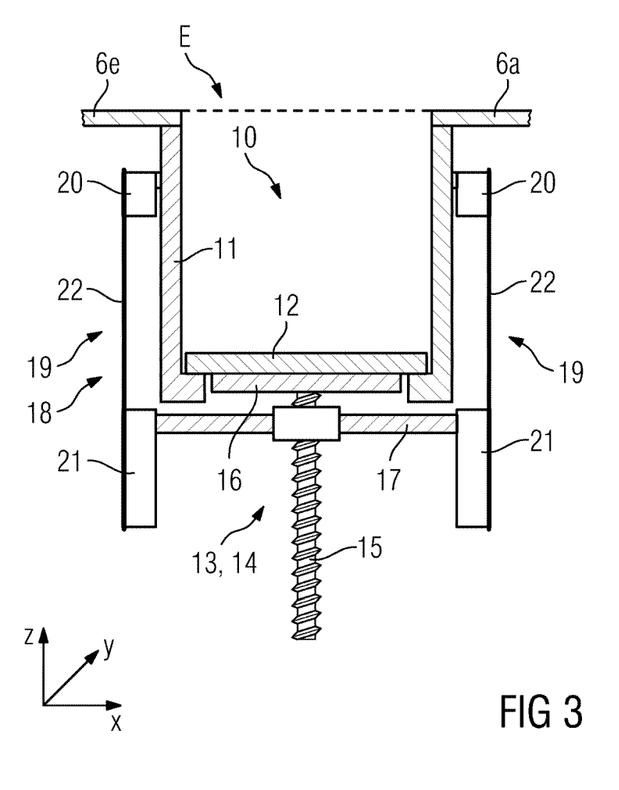

The frame construction 8 comprises at least one, e.g. shaft-like, receiving section 9 for receiving a powder module 11 comprising a powder reception room 10. Evidently, the receiving section 9 is arranged or formed in the section of the walls 6a, 6e forming the bottom of the process chamber 6. The receiving section 9 is located below the process chamber 6. The powder module 11 shown in the exemplary embodiment of FIGS. 1-3 is a construction module, in the powder reception room 11 (construction room) thereof the actual additive manufacturing of three-dimensional objects 2 is carried out. Principally, it would also be conceivable that the powder module 11 can be a metering module, which is provided for metering construction material 3 from the powder reception room 10 that can be applied in a construction plane in construction material layers to be selectively exposed or solidified by means of a coating device 7 of the apparatus, or an overflow module, which is provided for receiving non-solidified construction material 3 in the powder reception room 10. Independent of their specific designs, the powder modules 11 typically comprise a plate-like or plate-shaped carrying element 12 that is height-adjustably supported, limiting the powder reception room 10 at the bottom. The carrying element 12 is height-adjustably supported relative to the walls (not denoted in more detail) of the powder module 11 limiting the powder reception room 10 such that the powder reception room 10 can be changed by movements of the carrying element 12 relative to the walls limiting the powder reception room 10.

FIGS. 2, 3 each show an enlarged illustration of the individual unit II, III shown in FIG. 1.

A powder module 11 arranged in the receiving section 9 is movably supported between a non-operating position shown in FIG. 2, in which the powder module 11 is arranged at a certain (vertical) distance to a wall, here the walls 6a, 6e, of the frame construction 8 of the apparatus, limiting the process chamber 6 of the apparatus, or the carrying element 12 of the powder module (that is moved into an upper position) cannot be arranged or is not arranged in a construction field plane E of the apparatus 1, in which the selective exposure or solidification of respective construction material layers is carried out, and an operating position shown in FIG. 3, in which the powder module 11 is not arranged at a certain distance to the wall, here the walls 6a, 6e, of the frame construction 8 of the apparatus, limiting a process chamber 6, or the carrying element 12 of the powder module (that is moved into an upper position) can be arranged or is arranged in a construction field plane E.

From FIGS. 2, 3 it can be seen that the operating position of the powder module 11 corresponds to an upper position of the powder module 11, and the non-operating position of the powder module 11 corresponds to a lower position of the powder module 11.

From FIGS. 2, 3 it can further be seen that the apparatus 1 comprises an adjustment device 13, which is provided for height-adjusting the carrying element 12 of a powder module 11 moved into the receiving section 9. The adjustment device 13 comprises an, e.g. (electric) motor, adjustment drive (not shown) and an adjustment element assembly 14, the components thereof are discussed in more detail below.

A first component of the adjustment element assembly 14 is an adjustment element 15 that can be height-adjusted via the adjustment drive, which is provided in an operating position for height-adjusting the carrying element 12 of the powder module 11. The adjustment element 15 is an (elongated) adjustment spindle that can be driven to a respective height adjustment via the adjustment drive. The operating position of the adjustment element 15 shown in FIG. 3 is defined in that the adjustment element 15 directly abuts against the carrying element 12 or there is only a small distance, i.e. typically a distance of a few millimeters, especially less than 5 mm, between the adjustment element 15 (or the top surface thereof) and the carrying element 12 (or the bottom side thereof). Accordingly, a non-operating position of the adjustment element 15 shown in FIG. 2 is defined in that the adjustment element 15 does not directly abut against the carrying element 12 or there is a larger distance, i.e. typically a distance of several millimeters, especially more than 5 mm, between the adjustment element 15 and the carrying element 12.

From FIGS. 2, 3 it can be seen that the operating position of the adjustment element 15 corresponds to an upper position of the adjustment element 15 and the non-operating position of the adjustment element 15 corresponds to a lower position of the adjustment element 15.

Another component of the adjustment element assembly 14 is an, e.g. plate-like or plate-shaped, adjustment element table 16 (adjustment spindle table) arranged or formed in the section of the free end of the adjustment element 15 facing the carrying element 12. The adjustment element table 16 can enable a planar abutment on the carrying element 12 in the operating position of the adjustment element 15. The adjustment element table 16 can in the operating position of the adjustment element 15 at least partially be moved into the powder module 11, which for this purpose is provided with a corresponding recess.

Another component of the adjustment element assembly 14 is a plate-like or plate-shaped carrier 17. The carrier 17 is provided with an opening (not shown), e.g. in the form of a bore, possibly a threaded hole, that can be penetrated or is penetrated with the adjustment element 15. The adjustment element 15 can be height-adjusted relative to the (unmoved) carrier 17. Conversely, height adjustments of the carrier 17 cause height adjustments of the adjustment element 15.

The apparatus 1 further comprises a lifting device 18 comprising several lifting assemblies 19. A respective lifting assembly 19 comprises two lifting elements 20, 21. A respective first lifting element 20 is provided for generating a first partial lifting moving the powder module 11 located in the receiving section 9 from the non-operating position thereof into the operating position thereof, and vice versa. For this purpose, the first lifting element 20 can be coupled or is coupled with the powder module 11. A respective second lifting element 21 is for generating a second partial lifting moving the adjustment element assembly 14 from the non-operating position thereof into the operating position thereof, or moving the adjustment element 15 of the non-operating position thereof into the operating position thereof. The second lifting element 21 can for this purpose be coupled or is coupled with the adjustment element assembly 14, i.e. here the carrier 17. Both partial liftings can add up to an overall lifting that can be realized with the lifting device 18 or a respective lifting assembly 19.

The first lifting element 20 of a respective lifting assembly 19 is coupled for movement with the second lifting element 21 of the lifting assembly 19 via a power transmission element 22, e.g. in the form of a chain, a belt or the like, such that the first partial lifting that can be generated or is generated via the first lifting element 20 and the second partial lifting that can be generated or is generated via the second lifting element 21 are carried out synchronously, or the generation of the first partial lifting that can be generated or is generated via the first lifting element 20 and the generation of the second partial lifting that can be generated or is generated via the second lifting element 21 are carried out synchronously. The synchronous carrying out of the first and the second partial lifting results in a combined (vertical) movement of the powder module 11 and the adjustment element assembly 14; consequently, movements of the powder module 11 in the operating position thereof and movements of the adjustment element assembly 14 in the operating position thereof or movements of the adjustment element 15 in the operating position thereof are carried out combinedly. Respective movements of the powder module 11 and the adjustment element assembly 14 or the adjustment element 15 are thus carried out in a coupled manner.

The first partial lifting that can be generated or is generated via a respective first lifting element 20 is smaller than the second partial lifting that can be generated or is generated via a respective second lifting element 21. This is because the second lifting element 21 completes both the movements or lifting movements of the adjustment element assembly 14 or the movements and lifting movements of the powder module 11, whereas the first lifting element 20 completes only the movements or lifting movements of the powder module 11. The first partial lifting that can be generated via the first lifting element 20 can e.g. be in a range between 40 and 60 mm, the second partial lifting that can be generated via the second lifting element 21 can e.g. be in a range between 60 and 90 mm.

A respective first lifting element 20 is movably supported between two end positions; as it follows from below, the two end positions of the first lifting element 20 are rotational positions; wherein a first end position of the first lifting element 20 is assigned to the operating position of the powder module 11, and a second end position of the first lifting element 20 is assigned to the non-operating position of the powder module 11. Assigning respective end positions of the first lifting element 20 to the operating or non-operating position of the powder module 11 is understood to mean that the powder module 11 is moved into the operating position when the first lifting element 20 is moved into the first end position, and the powder module 11 is moved into the non-operating position when the first lifting element 20 is moved into the second end position.

Analogously, a respective second lifting element 21 is movably supported between two end positions; as it follows from below the two end positions of the second lifting element 21 are rotational positions; wherein a first end position of the second lifting element 21 is assigned to the operating position of the adjustment element assembly 14 or the adjustment element 15, and a second end position of the second lifting element 21 is assigned to the non-operating position of the adjustment element assembly 14 or the adjustment element 15. Assigning respective end positions of the second lifting element 21 to the operating or non-operating position of the adjustment element assembly 14 or the adjustment element 15 is understood to mean that the adjustment element assembly 14 or the adjustment element 15 is moved into the operating position when the second lifting element 21 is moved into the first end position, and the adjustment element assembly 14 or the adjustment element 15 is moved into the non-operating position when the second lifting element 21 is moved into the second end position.

Figure 4:
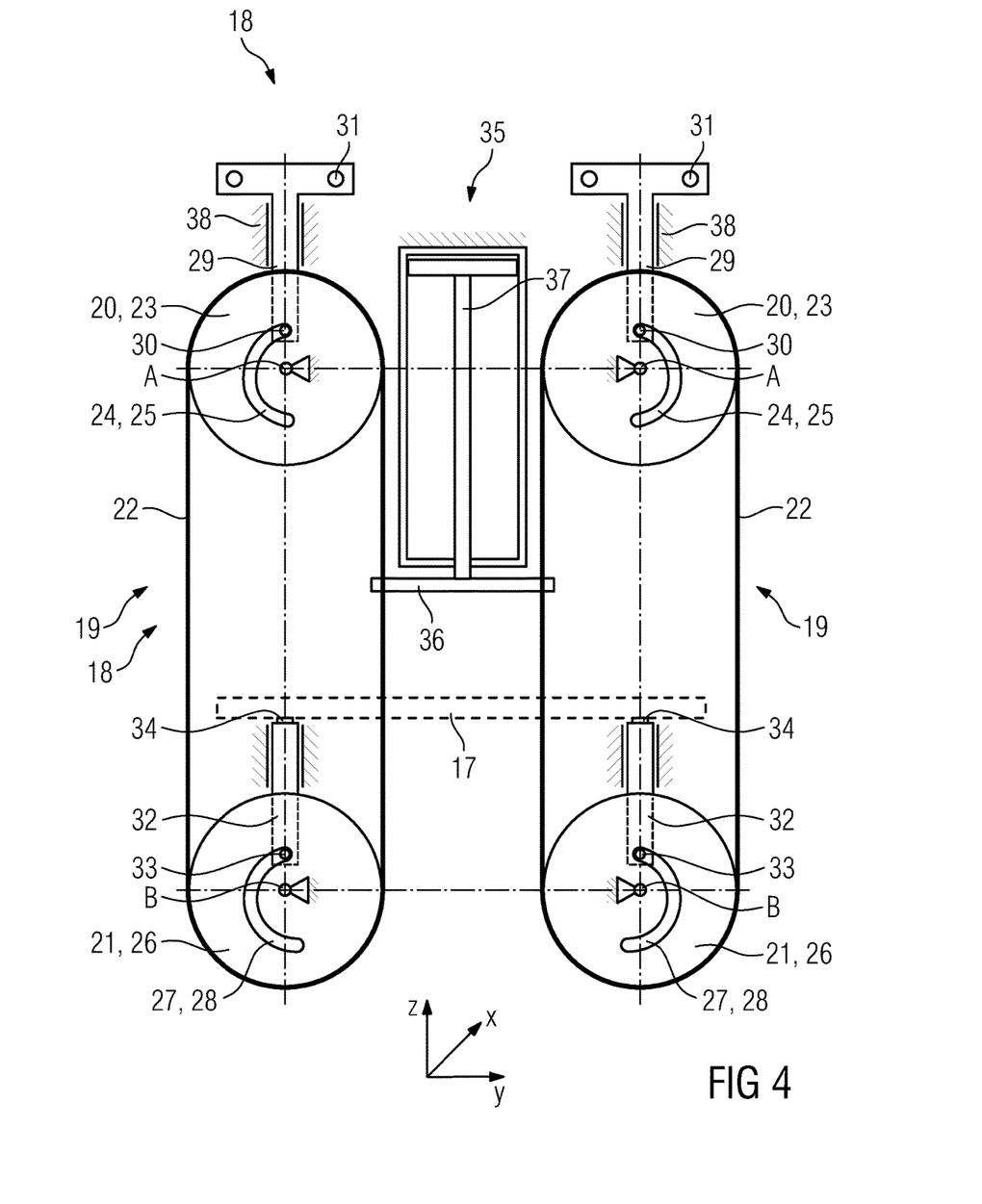
FIGS. 4, 5 each show a schematic diagram of a lifting device according to an exemplary embodiment.
Figure 5:
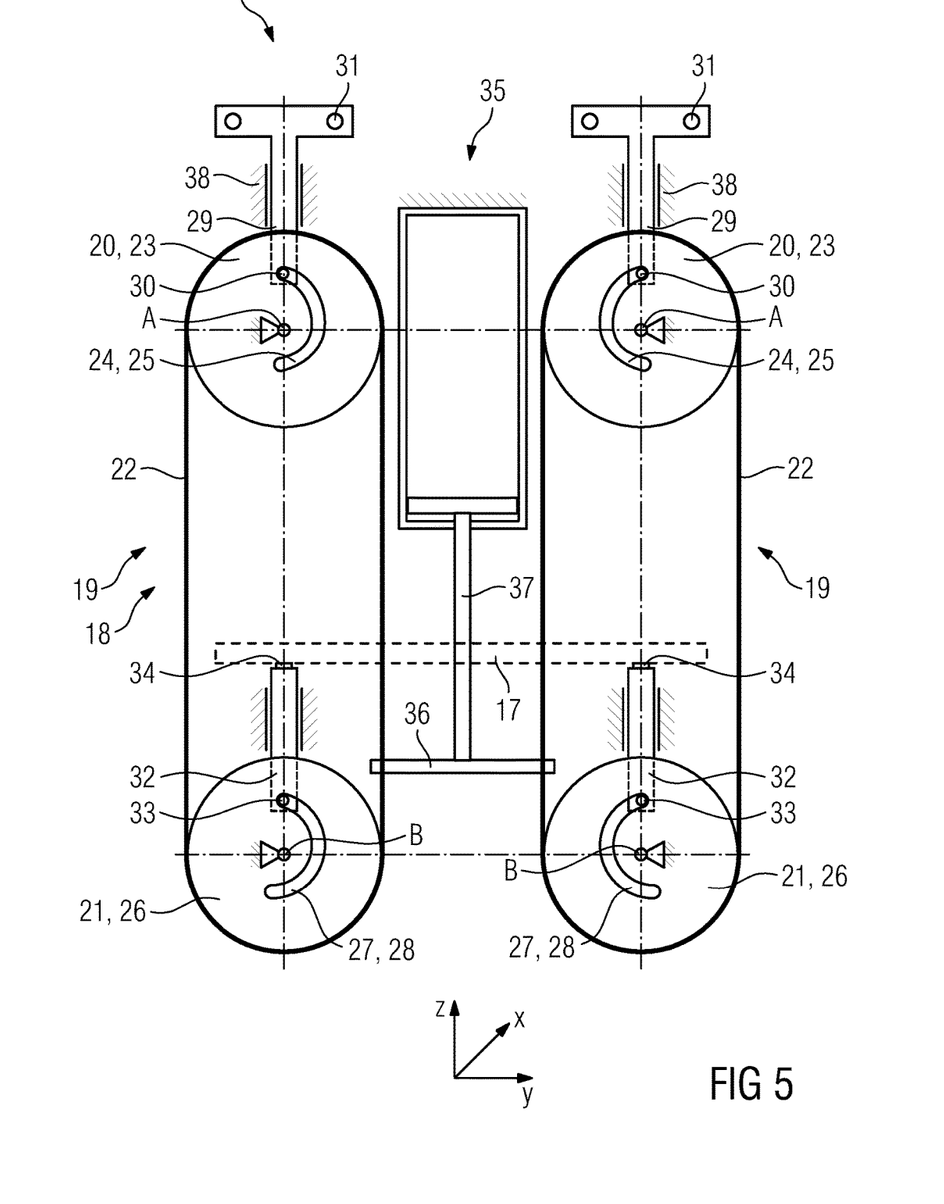

FIGS. 4, 5 each show a schematic diagram of a part of the lifting device 18 according to an exemplary embodiment. The part of the lifting device 19 is illustrated in a view rotated by 90° in FIGS. 4, 5 compared to the view given in FIGS. 2, 3. A powder module 11 is not shown for the sake of clarity.

In FIG. 4 the first lifting elements 20 are moved into the second end position such that the powder module 11 is moved into the non-operating position (lower position). Similarly, the second lifting elements 21 are moved into the second end position such that the adjustment element assembly 14 or the adjustment element 15 is moved into the non-operating position (lower position). In FIG. 5 the first lifting elements 20 are moved into the second end position such that the powder module 11 is moved into the operating position (upper position). Similarly, the second lifting elements 21 are moved into the first end position such that the adjustment element assembly 14 or the adjustment element 15 is moved into the operating position (upper position).

From FIGS. 4, 5 it can be seen that a respective first lifting element 20 can be formed as a control element 23 that is disk-like or disk-shaped, i.e. formed as a cam disk, rotatably supported around a rotational axis A, having a control surface 25 defining a curve-like or curve-shaped trajectory 24 of a certain length, in the form of a recess or groove. The end positions of the first lifting element 20 are defined by the respective ends of the trajectory 24 and thus correspond to the respective rotational positions of the first lifting element 20 in the ends of the trajectory 24. The outer circumference of the first lifting element 20 can be formed with power transmission elements (not shown), e.g. in the form of teeth, which enable a power transmission, i.e. especially a torque transmission, from the power transmission element 22 to the first lifting element 20.

Analogously, a respective second lifting element 21 can be formed as a control element 26 that is disk-like or disk-shaped, i.e. formed as a cam disk, rotatably supported around a rotational axis B, having a control surface 28 defining a curve-like or curve-shaped trajectory 27 of a certain length, in the form of a recess or groove. The end positions of the second lifting element 21 are defined by the respective ends of the trajectory 27 and thus correspond to the respective rotational positions of the second lifting element 20 in the ends of the trajectory 27. The outer circumference of the second lifting element 21 can also be formed with power transmission elements (not shown), e.g. in the form of teeth, which enable a power transmission, i.e. especially a torque transmission, from the power transmission element 22 to the second lifting element 21.

As mentioned, the first partial lifting that can be generated or is generated via a respective first lifting element 20 is smaller than the second partial lifting that can be generated or is generated via a respective second lifting element 21. This is reflected in the length of the trajectories 24, 27 of the control surfaces 25, 28 of the respective control elements 23, 26; the length of the trajectory 24 of the control surface 25 of the control element 23 of the first lifting element 20 is therefore smaller than the length of the trajectory 27 of the control surface 28 of the control element 26 of the second lifting element 21.

From FIGS. 4, 5 it can be seen that the control element 23 of a respective first lifting element 20 can be coupled, especially detachably (in a damage-free and non-destructive manner), via an adjustment element 29 movably supported along the control surface 25 or in the control surface 25—here formed as a T-shaped support, for example—with the powder module 11. The adjustment element 29 comprises a first coupling element 30 for coupling the adjustment element 29 with the control surface 25 and at least one second coupling element 31 for coupling the adjustment element 29 with the powder module 11. The first coupling element 30 is an engagement element for engaging into a control surface 25, which is, as mentioned, formed as a recess or groove extending in a curve-like manner. A second coupling element 31 is an engagement element for engaging into a recess (not shown) formed on the powder module 11. Respective engagement elements can be formed as or comprise sliding elements or rolling elements.

Analogously, the control element 26 of a respective second lifting element 21 can be coupled, possibly detachably (in a damage-free and non-destructive manner), via an adjustment element 32 movably supported along the control surface 28 or in the control surface 28—here formed as an I-shaped support, for example—with the adjustment element assembly 14, i.e. the carrier 17. The adjustment element 32 of the second lifting element 21 comprises a first coupling element 33 for coupling the adjustment element 32 with the control surface 28 and an (optional) second coupling element 34 for coupling the adjustment element 32 with the adjustment element assembly 14 or the carrier 17. The first coupling element 33 is an engagement element for engaging into a control surface 28, which is, as mentioned, formed as a recess or groove that extends in a curve-like manner. The second (optional) coupling element 34 can especially be a support element for supporting a component of the carrier 17, or an engagement element for engaging into a recess formed on the adjustment element assembly 14, especially on the carrier 17. Respective engagement elements can, in turn, be formed as or comprise sliding elements or rolling elements.

The apparatus 1 comprises a lifting drive device 35 assigned to several lifting assemblies 19. The lifting drive device 35, especially formed acting pneumatically or hydraulically, is provided for generating a lifting power realizing the respective partial liftings. Evidently, a lifting drive element 36 associated with the lifting drive device 35 and coupled with a drive or a lifting piston 37 of the lifting drive device 35 is coupled with the power transmission elements 22 of the lifting assemblies 19. Consequently, the power transmission is carried out between the lifting drive device 35 and the lifting device 18 or the lifting assemblies 19 directly via the power transmission means 22 coupling the lifting elements 20, 21 of a respective lifting assembly 19.

As shown in FIGS. 4, 5 and as already mentioned, the lifting device 18 comprises several lifting assemblies 19. The lifting assemblies 19 forming the lifting device 18 are arranged in pairs. For example, a first pair of lifting assemblies 19 laterally adjacent, consequently arranged next to each other can be arranged or formed on a first frame construction element 38, possibly a first wall of the frame construction 8, laterally limiting the receiving device 9 (cf. FIGS. 4, 5). A second pair of lifting assemblies 19 laterally adjacent, consequently arranged next to each other is arranged or formed on a second frame construction element, possibly a second wall of the frame construction, laterally limiting the receiving device 8. The first frame construction element 38 laterally limiting the receiving device 9 is arranged opposite the second frame construction element laterally limiting the receiving device 9, such that the pairs of lifting assemblies 19 arranged laterally adjacent are arranged opposite to each other.

To the pair of lifting assemblies 19 arranged laterally adjacent shown in FIGS. 4, 5 the lifting drive device 35 is commonly assigned. The lifting drive element 36 associated with the lifting drive device 35 is, as mentioned, coupled with the power transmission elements 22 of the respective lifting assemblies 19. Analogously, to a second pair of lifting assemblies 19 arranged laterally adjacent arranged opposite a second common lifting drive device (not shown) is assigned. The lifting drive element associated with the lifting drive device is coupled with the power transmission elements 22 of the respective lifting assemblies 19.

Overall, a redundant or symmetric design of the lifting device 18 or a redundant or symmetric arrangement of respective lifting assemblies 19 is provided.

Although not shown in the Figures, it is conceivable that, in order to ensure synchronous movement in case of a respective arrangement of lifting assemblies 19 in pairs and opposite to each other, second lifting elements 21 opposite to each other can be coupled for movement via a bar-like or bar-shaped coupling element (not shown) connecting these, e.g. in the form of a power transmission bar.

The invention claimed is:

1. An apparatus (1) for additive manufacturing of three-dimensional objects (2) by successive, selective layer-by-layer exposure and thus solidification of construction material layers of a construction material (3) that can be solidified by an energy beam (5) generated by an energy beam generation device (4), comprising:
   a frame construction (8) with at least one receiving section (9) for receiving a powder module (11) comprising a powder reception room (10), wherein the powder module (11) comprises a height-adjustable carrying element (12) configured to limit a bottom of the powder reception room (10),
   an adjustment device (13) configured to adjust a height of the carrying element (12) of the powder module (11) moved into the receiving section (9), wherein the adjustment device (13) comprises at least one height-adjustable adjustment element assembly (14), which is provided in an operating position for adjusting the height of the carrying element (12) of the powder module (11), and
   a lifting device (18), wherein the lifting device (18) comprises at least one lifting assembly (19), wherein the lifting assembly (19) comprises a first lifting element (20) configured to generate a first partial lifting moving the powder module (11) from a non-operating position into an operating position, and a second lifting element (21) configured to generate a second partial lifting moving the adjustment element assembly (14) from a non-operating position into an operating position, wherein the first lifting element (20) is coupled for movement with the second lifting element (21) via a power transmission element (22), such that the first partial lifting that can be generated or is generated via the first lifting element (20) and the second partial lifting that can be generated or is generated via the second lifting element (21) are configured to be carried out synchronously.

2. The apparatus according to claim 1, characterized in that the first partial lifting that can be generated or is generated via the first lifting element (20) is smaller than the second partial lifting that can be generated or is generated via the second lifting element (21).

3. The apparatus according to claim 1, characterized in that the first lifting element (20) can be coupled or is coupled with the powder module (11) and the second lifting element (21) can be coupled or is coupled with the adjustment element assembly (14).

4. The apparatus according to claim 1, characterized in that the first lifting element (20) is movably supported between two end positions, wherein a first end position of the first lifting element (20) is assigned to the operating position of the powder module (11), and a second end position of the first lifting element (20) is assigned to the non-operating position of the powder module (11), and
   the second lifting element (21) is movably supported between two end positions, wherein a first end position of the second lifting element (21) is assigned to the operating position of the adjustment element assembly (14), and a second end position of the second lifting element (21) is assigned to the non-operating position of the powder module (14).

5. The apparatus according to claim 4, characterized in that the first lifting element (20) is formed as or comprises an, especially disk-shaped, control element (23) rotatably supported around a rotational axis (A), having a control surface (25) defining an, especially curve-like, trajectory (24) of a certain length, wherein the end positions of the first lifting element (20) are defined by the respective ends of the trajectory (24), and
   the second lifting element (21) is formed as or comprises an, especially disk-shaped, control element (26) rotatably supported around a rotational axis (B), having a control surface (28) defining an, especially curve-like, trajectory (27) of a certain length, wherein the end positions of the second lifting element (21) are defined by the respective ends of the trajectory (27).

6. The apparatus according to claim 5, characterized in that the control element (23) of the first lifting element (20) can be coupled or is coupled with the powder module (11) via an adjustment element (29) movably supported along the control surface (24), and the control element (26) of the second lifting element (21) can be coupled or is coupled with the adjustment element assembly (14) via an adjustment element (32) movably supported along the control surface (27).

7. The apparatus according to claim 1, characterized by a lifting drive device (35) assigned to the at least one lifting assembly (19), which is provided for generating a lifting power realizing the respective partial liftings, wherein a lifting drive element (36) associated with the lifting drive device (35) is coupled with the power transmission element (22).

8. The apparatus according to claim 1, characterized in that the lifting device (18) comprises several lifting assemblies (19), wherein a first pair of lifting assemblies (19), which are arranged laterally adjacent, is arranged or formed on a first frame construction element (38), especially a first wall of the frame construction (8), laterally limiting the receiving device (9), and a second pair of lifting assemblies (19), which are arranged laterally adjacent, is arranged or formed on a second frame construction element, especially a second wall of the frame construction (8), laterally limiting the receiving device (9), wherein the first frame construction element (38) is arranged opposite the second frame construction element.

9. The apparatus according to claim 7, characterized in that to the first pair of lifting assemblies (19), which are arranged laterally adjacent, a common lifting drive device (35) is assigned, wherein the lifting drive element (36) associated with the lifting drive device (35) is coupled with both the power transmission element (22) of the first lifting assembly (19) and the power transmission element (22) of the second lifting assembly (19) of the first pair, and to the second pair of lifting assemblies (19), which are arranged laterally adjacent, a common lifting drive device (35) is assigned, wherein the lifting drive element (36) associated with the lifting drive device (35) is coupled with both the power transmission element (22) of the first lifting assembly (19) and the power transmission element of the second lifting assembly (19) of the second pair.

10. The apparatus according to claim 8, characterized in that opposing second lifting elements (21) of the first and the second pair of lifting assemblies (19), which are arranged laterally adjacent, are coupled for movement via an, especially bar-shaped, coupling element connecting said elements.

\* \* \* \* \*